United States Patent [19]

Sagiv

[11] Patent Number: 5,688,356
[45] Date of Patent: Nov. 18, 1997

[54] WATER-BASED URETHANE ADHESIVE

[75] Inventor: Efraim Sagiv, New Haven, Conn.

[73] Assignee: Olin Corporation, Cheshire, Conn.

[21] Appl. No.: 744,288

[22] Filed: Nov. 6, 1996

[51] Int. Cl.$^6$ ............................................. C09J 175/12
[52] U.S. Cl. .................. 156/331.7; 524/270; 524/271; 524/507; 524/539; 524/591
[58] Field of Search .......................... 524/270, 271, 524/507, 539, 591; 156/331.7

[56] References Cited

U.S. PATENT DOCUMENTS

| | | | |
|---|---|---|---|
| 3,923,747 | 12/1975 | Kolycheck | 528/28 |
| 4,255,552 | 3/1981 | Schollenberger et al. | 528/50 |
| 4,352,858 | 10/1982 | Stanley | 428/423.1 |
| 4,507,430 | 3/1985 | Shimada et al. | 524/839 |
| 4,543,393 | 9/1985 | Blum et al. | 525/124 |
| 4,644,030 | 2/1987 | Loewrigkeit et al. | 524/457 |
| 4,663,377 | 5/1987 | Hombach et al. | 524/196 |
| 4,740,424 | 4/1988 | Schumacher et al. | 428/419 |
| 4,740,536 | 4/1988 | Chao | 523/406 |
| 4,762,880 | 8/1988 | Leung | 524/853 |
| 4,791,189 | 12/1988 | Yu | 528/355 |
| 4,792,574 | 12/1988 | Berkowitz | 521/137 |
| 4,814,215 | 3/1989 | Lautenschlaeger et al. | 428/40 |
| 4,965,117 | 10/1990 | Lautenschlaeger et al. | 428/182 |
| 4,977,219 | 12/1990 | Watson, Jr. | 525/329.5 |
| 5,037,886 | 8/1991 | Blizzard et al. | 525/105 |
| 5,061,772 | 10/1991 | Yu | 526/320 |
| 5,102,714 | 4/1992 | Mobley et al. | 428/95 |
| 5,120,790 | 6/1992 | Yu | 525/186 |
| 5,453,300 | 9/1995 | Diener et al. | 427/393.5 |
| 5,496,642 | 3/1996 | Martinez et al. | 428/423.1 |
| 5,523,344 | 6/1996 | Maksymkiw et al. | 524/507 |

OTHER PUBLICATIONS

"Aqueous Anionic Polyurethane Dispersions", by H.X. Xiao, S. Yang, J.A. McLean, J. Kresta, K.C. Frisch, D.P. Higley and R.A. Smiley, Presented at the Water–Borne & Higher–Solids, and Powder Coatings Symposium, Feb. 24–26, 1993, New Orleans, LA.

"Structure–Property Relationships of Aqueous Polyurethane Dispersions", by Husn–Tsing Lee, Yeong–Tsyr Hwang, Nien–Shi Chang, Charles C.T. Huang and Hsiao–Chian Li, Presented at the Waterborne, High–Solids, and Powder Cartridge Symposium, Feb. 22–24, 1995, New Orleans, LA.

"Waterborne Polyurethanes", by James W. Rosthauser and Klaus Nachtkamp, Advances in Urethane Science and Technology, 1987, No. 10, pp. 121–162.

*Primary Examiner*—Patricia A. Short
*Attorney, Agent, or Firm*—Wiggin & Dana

[57] ABSTRACT

The present invention is directed to a water-based adhesive composition comprising an admixture of a first aliphatic water-based urethane resin that is the reaction product of polycaprolactonediol or polycaprolactonetriol, 4,4-methylene bis(cyclohexylisocyanate), and dimethylolpropionic acid extended with a diamine, and a second aliphatic water-based urethane resin that is the reaction product of 2,6-hexanediol, 4,4-methylene bis(cyclohexylisocyanate), and dimethylolpropionic acid extended with a diamine. The first aliphatic water-based urethane resin comprises from about 99 to about 20 percent by weight of the composition, and the second aliphatic water-based urethane resin comprises from about 1 to about 80 percent by weight of the composition. The invention is also directed to methods of adhering a substrate and a workpiece using the adhesive composition of the invention.

21 Claims, No Drawings

WATER-BASED URETHANE ADHESIVE

BACKGROUND OF THE INVENTION

1. Field of the Invention

The present invention relates to water-based adhesives, and more particularly to aliphatic isocyanate-terminated water based polyurethane resin compositions that are admixtures of an aliphatic water-based urethane resin that is the reaction product of polycaprolactonediol or triol and a diisocyanate compound, and an aliphatic water-based urethane resin that is the reaction product of 2,6-hexanediol and a diisocyante compound. The present invention also relates to a method of attaching a workpiece to a substrate using the adhesive composition of the invention.

2. Description of the Related Art

Polyurethanes are used in a variety of fields such as adhesives, impregnation agents, and coating agents. Polyurethanes have been particularly useful in the adhesive field due primarily to their desirable adhesive properties to a wide range of substrates including metals, woods, fabric, plastics, and the like. Polyurethane-based adhesives have been demonstrated to offer good chemical resistance, elasticity, and durability. Due to these advantages, polyurethane adhesives have found many applications, particularly in the automotive field.

Automobiles are exposed to a variety of environmental factors, such as wide temperature fluctuations, wind, water, salt, road dirt, insects, and UV radiation. The adhesives used in bonding trim or other pieces must be resistant to these factors for many years in order the meet the quality standards that are demanded in the current marketplace. In addition, strict environmental regulations have limited the use of solvent-based adhesives. The solvents used in the manufacture of these adhesives result in several disadvantages. The organic solvents generally evaporate quickly and result in an adhesive mixture that may become too viscous for many applications. In addition, the costs associated with disposal of the organic solvents result in a higher cost of the product. Moreover, the vaporized solvents that are produced during manufacture or cure have an adverse effect on the environment and the workplace in that they are often toxic and/or odoriferous.

Aqueous water-based adhesives have been utilized as a replacement for adhesives using organic solvents, and are the subject of existing patents. However, while environmentally responsible, current aqueous adhesives do not provide the level of adhesion and durability offered by adhesives using an organic solvent.

U.S. Pat. No. 4,507,430 to Shimeda discloses a water-based polyurethane emulsion useful for an adhesive or coating for a polyolefin resin, comprising a hydrogenated polyol component and a polyisocyanate component.

U.S. Pat. No. 4,740,536 to Chao discloses a water based binder, coating, and adhesive composition comprising an aqueous dispersion of polymer latex and an amine curing agent. The polymer latex is alkali-curable and polymerized from a monomer mixture containing quaternary ammonium monomer and an epoxy resin.

U.S. Pat. No. 4,792,574 to Berkowitz discloses a stable polymer/polyisocyanate dispersion comprising a polyisocyanate, and a polymer that is the reaction product of an ethylenically unsaturated macromolecular monomer, a functional monomer, and at least one other ethylenically unsaturated monomer.

U.S. Pat. No. 5,523,344 to Maksymkiw et al. discloses an adhesive formulation comprising a hydrophobic elasticizer, and an aqueous plasticized dispersion consisting of sulfonated polyester urethane, a nonsulfonated polyester urethane, and a water-based polymer or copolymer.

Accordingly, there is a need in the art for an economical, environmentally safe, adhesive formulation that provides high adhesive strength over a wide variety of environmental conditions. The adhesive composition of this invention is believed to meet that need.

SUMMARY OF THE INVENTION

Accordingly, one aspect of the present invention is directed to a water-based adhesive composition comprising an admixture of a first aliphatic water-based urethane resin that is the reaction product of polycaprolactonediol or polycaprolactonetriol, 4,4-methylene bis(cyclohexylisocyanate), and dimethylolpropionic acid extended with a diamine, and a second aliphatic water-based urethane resin that is the reaction product of 2,6-hexanediol, 4,4-methylene bis(cyclohexylisocyanate), and dimethylolpropionic acid extended with a diamine. The first aliphatic water-based urethane resin comprises from about 99 to about 20 percent by weight of the composition, and the second aliphatic water-based urethane resin comprises from about 1 to about 80 percent by weight of the composition.

Another aspect of the invention is directed to a water-based adhesive composition, comprising an admixture of a first aliphatic water-based urethane resin that is the reaction product of polycaprolactonediol or polycaprolactonetriol, 4,4-methylene bis(cyclohexylisocyanate), and dimethylolpropionic acid extended with a diamine, a second aliphatic water-based urethane resin that is the reaction product of 2,6-hexanediol, 4,4-methylene bis(cyclohexylisocyanate), and dimethylolpropionic acid extended with a diamine, and a tackifier. The first aliphatic water-based urethane resin comprises from about 99 to about 20 percent by weight of said composition, the second aliphatic water-based urethane resin comprises from about 1 to about 80 percent by weight of said composition, and the tackifier comprises about 0.1 to about 20 percent by weight of the composition.

In another aspect, the present invention is directed to a method of adhering a workpiece to a substrate, comprising applying the above-described adhesive composition onto a substrate, drying the adhesive composition at a temperature of from 400° to 600° F. for from between 30 min and 10 sec, respectively, and adhering the workpiece to the substrate.

DESCRIPTION OF THE PREFERRED EMBODIMENTS

It has been surprisingly found that a combination of an aliphatic water-based urethane resin that is the reaction product of polycaprolactonediol or triol, 4,4-methylene bis(cyclohexylisocyanate), and dimethylolpropionic acid extended with a diamine with an aliphatic water-based urethane resin that is the reaction product of 2,6-hexanediol 4,4-methylene bis(cyclohexylisocyanate), and dimethylolpropionic acid extended with a diamine provides greater adhesion characteristics (as measured by peel tests) than either of the two components individually. While not being bound to any particular theory, it is believed that the combination of the above-described first and second components of the composition interact synergistically to provide an adhesive combination with enhanced adhesion, application, and disposal properties. These properties are especially attractive for automotive trim and other applications where a water-based adhesive is suitable for several reasons.

First, the water-based nature of the composition alleviates the use and disposal of toxic organic compounds. Government regulation of the use and disposal of toxic organic substances has forced many manufacturers to turn to water-based compositions. In addition, the water-based nature of the adhesive composition results in less organic fumes being given off during application and drying processes. In addition, clean up is accomplished easily with water.

Second, automobiles are constantly attacked by harsh elements such as wind, water, salt, sand, and UV light. The adhesives that attach various trim pieces to the automobile must be able to withstand this attack for many years. The adhesive composition of the present invention provides enhanced adhesion of various trim pieces to better endure the environmental factors that automobiles face, and provide a higher level of quality for the automobile. It is to be understood, however, that the adhesive composition of the invention is not limited to automotive trim applications. The adhesive composition of the invention is useful in any application where a durable, environmentally safe adhesive with high adhesion characteristics is required.

The adhesive composition of the invention generally comprises a combination of aliphatic water-based polyurethane resins. As used herein, the term "water-based polyurethane resin" refers to those polyurethane resins in which water is a major component (i.e., about at least 50% by weight). In general, the polyurethane resins useful in the composition of the invention are formed by reaction of 4,4-methylene bis(cyclohexyl isocyanate) ($H_{12}$-MDI) and a diol compound.

The first component of the composition of the invention is an aliphatic water-based urethane resin that is an aqueous emulsion of the reaction product of polycaprolactonediol or polycaprolactonetriol, a diisocyanate compound, and dimethylolpropionic acid extended with a diamine. Preferably, this component of the composition comprises from about 20 to about 99 percent by weight of the total composition, and more preferably from about 60 to about 80 percent by weight of the total composition. Diisocyanates that are useful reagents in the reaction with polycaprolactonediol or triol to form the first component of the composition include 4,4-methylene bis(cyclohexylisocyanate) ($H_{12}$-MDI), 1,12 dodecane diisocanate ($C_{12}$-DDI), 1,4'-cyclohexane diisocyanate (CHDI), 1,6-hexamethylene diisocyanate (HDI), isophorone diisocyanate (IPDI), 2-methylpentamethylene diisocyanate (MPMDI), m-tetramethylxylylene diisocyanate (TMXDI), 2,4,4-trimethylhexamethylene diisocyanate (TMHDI), and the like. In one preferred embodiment, the first component of the composition is the reaction product of polycaprolactonediol or polycaprolactonetriol, 4,4-methylene bis(cyclohexylisocyanate) ($H_{12}$-MDI), and dimethylolpropionic acid extended with a diamine. This product is base neutralized with a tertiary amine to produce the aliphatic water-based urethane resin of the first component of the composition of the invention. This preferred aliphatic water-based urethane resin sold commercially as "Q-THANE" QW20-1 (available from K. J. Quinn & Co. Inc., Seabrook, N.H.).

The second component of the composition of the invention is an aliphatic water-based urethane resin that is an aqueous emulsion of the reaction product of 2,6-hexanediol, a diisocyanate compound, and dimethylolpropionic acid extended with a diamine. Preferably, this second component of the composition comprises from about 1 to about 80 percent by weight of the total composition, and more preferably from about 15 to about 30 percent by weight of the total composition. The same diisocyanates that are recited above for the first component of the composition of the invention are also useful reagents in the reaction that forms the second component of the composition. In one preferred embodiment, the second component of the composition is the reaction product of 2,6-hexanediol, 4,4-methylene bis (cyclohexyl isocyanate) ($H_{12}$-MDI), and dimethylolpropionic acid extended with a diamine. This product is base neutralized with a tertiary amine to produce the aliphatic water-based urethane resin of the second component of the composition of the invention. This preferred aliphatic water-based urethane resin is sold commercially as "Q-THANE" QW18-1 (available from K. J. Quinn & Co., Inc., Seabrook, N.H.).

The formulation of the invention may include other ingredients that enhance the adhesion of the aliphatic water-based combination. Such additional additives include, but are not limited to, tackifiers, film-forming solvents, defoamers, surfactants, dyes, and combinations thereof.

Tackifiers may be added to the composition of the invention to make the adhesive composition tacky and to wet the surface of the substrate as the adhesive is applied. A preferred tackifier that is useful in the composition of the invention is an aqueous dispersion of rosin ester sold under the name of TACOLYN 1085 (available from Hercules Incorporated, Wilmington Del.). Other useful tackifiers include Dresinol 215, aromatic vinyl copolymer tackifiers such as Piccotex LC (Hercules Inc.), and Pentalyn (Hercules, Inc.). The tackifier may be added to the adhesive composition in a range from 0 to about 20 percent by weight of the total composition, and more preferably in the range of 3.5 to 7.5 percent by weight of the total composition.

Butoxyethanol may be added to the adhesive composition of the invention as a film-forming agent. The film-forming agent is added to the composition to provide a smooth the adhesive surface for maximum adhering area. Alternative film-forming agents include N-methylpyrrolidone, diethylene glycol, or other organic solvents known in the art that have boiling points higher than that of water. Preferably, the film-forming agent is present in the composition from about 0 to about 1% by weight of the total composition, and more preferably, from about 0.0005 to about 0.015% by weight of the total composition.

A defoaming agent may be included in the adhesive composition of the invention to prevent air entrapment during processing and to provide a smooth adhesive surface that provides maximum surface area for adhesion. Exemplary defoaming agents include siloxane-based defoaming agents, such as Dow Corning #62, silicon oils, mineral oils, modified alcohol ethoxylates, EO/PO block copolymers (repeating blocks of ethyoxy and propoxy groups), phosphate esters, hydrophobic silica, and fatty alcohols as well as blends of these. Other defoaming agents include coblock polymers of EO/PO sold under the trademark "BASF PLURONICS", alkoxylated straight chain alcohols sold under the trademark "PLURFACS"; alkoxylated fatty acids, alcohols, or glycols sold under the trademark "ANTAROX"; alkoxylated alcohols and coblock polymers of EO/PO sold under the trademark "MACOL"; alkylphenol alkoxylates sold under the trademark "TRITON CF"; alkoxylated alcohols sold under the trademark "TRITON DF"; alkylated secondary alcohols sold under the tradename "TERGITOL", "MINIFOAM", "15S" and "TMN"; and alkoxylated linear alcohols and glycols sold under the trademark "SURFONIC". The defoaming agent preferably comprises about 0 to about 1% by weight of the total adhesive composition, and more preferably 0.00125 to about 0.0125% by weight of the total adhesive composition.

A surfactant may be added to the adhesive composition of the invention to aid in leveling the composition on the substrate as it is applied. One preferred type of surfactant useful in the adhesive composition of the invention are the silicon-based surfactants, such as Silwet (Witco Chemical Co.). Another exemplary surfactant useful in the composition of the invention includes poly(oxyethylene/oxypropylene) alkyl ethers sold under the trademark "POLYTERGENT".

Alternatively, nonionic surfactants which are coblock polymers of ethylene oxide/propylene oxide monomers may be used in the formulation of the invention. These compounds are known commercially as the "POLY-TERGENT" P and E Series and are available from Olin corporation. Preferably, the surfactant component is present in the composition from about 0 to about 1 percent by weight of the total composition, and more preferably from about 0.00125 to about 0.0125% by weight of the total composition.

The adhesive composition of the invention is prepared by mixing approximately 25% of the first component of the composition and the tackifier (if desired) in a commercial mixer (i.e., a Ross mixer/emulsifier). The mixture is mixed at approximately 1800 rpm for 10 minutes, and additional additives (e.g., film-forming agent, defoamer, surfactant) are added if desired. The additional additives may be added in diluted form to facilitate their dispersion during processing. After approximately 10 minutes of mixing, the second component of the composition is added to the mixture, followed by the remaining 75% of the first component. The entire mixture is blended until a smooth and homogeneous adhesive composition is obtained.

The adhesive composition of the invention is applied to substrates using the following procedure. A portion of wet adhesive (approximately 2–5 ml) produced as set forth above is applied to an aluminum coupon substrate (i.e., 6"×12"×10 mil thick aluminum strip, chemically cleaned) and drawn to approximately 0.2 mils thick using a standard draw bar. The adhesive coating is then dried in an oven set at a predetermined temperature for a predetermined time. The aluminum coupon coated with dried adhesive is then cut into strips of approximately 0.5 inch in width.

The drying conditions are particularly important to the overall performance of the adhesive composition. In general, longer drying times at higher temperatures produce laminates with greater peel strengths. However, care must be taken to avoid changing the properties of the aluminum substrate while heating. Preferably, the drying temperatures range from 400° to 600° F. and drying times range from 30 min to 10 sec, respectively. For example, peel strengths of 100, 82 and 45 pounds per linear inch have been observed at drying temperatures of 570° F., 540° F., and 510° F., respectively, using a composition comprising 68% by weight Q-THANE QW20-1, 26% by weight Q-THANE QW18-1, about 5.5% by weight TACOLYN 1085, 0.005% by weight butoxyethanol, 0.005% by weight Dow Corning #62 defoamer, 0.005% by weight Silwet surfactant, with water added to bring the total composition to 100%, and drying for 28 seconds. The drying step removes water and remaining volatile organic materials from the adhesive and prepares the adhesive to establish maximum adhesion between the workpiece and the substrate.

A rigid polyvinyl chloride (PVC) workpiece is next applied to the cured adhesive. The workpiece may be applied to the cured adhesive in several ways. In one embodiment generally useful in small scale applications, such as in a laboratory, the adhesive-coated aluminum coupon is warmed (i.e., to approximately 470° F.) and pressed onto the PVC workpiece at at about 100 psi for about 7 seconds. The thus-produced laminate may be evaluated as described below.

In an alternative embodiment, the workpiece may be applied to the adhesive-coated substrate in a continuous manner. Freshly produced PVC workpiece may be extruded from an extruder and applied to an adhesive-coated aluminum strip moving on a conveyor. Pressure (i.e., approximately 3500 psi) is applied to the laminate to adhere the substrate and the workpiece together. This embodiment is particularly suitable for commercial applications when large amounts of laminate must be produced rapidly.

The aluminum laminate produced above was evaluated for tear strength using an Instron tensile tester. The apparatus was arranged to measure tensile tear strength of the laminate either perpendicularly (90°) or parallel (180°) from the laminate surface. The tensile strength of the laminate is measured in pounds per linear inch (lbs/LI). Preferably, the adhesive composition of the invention is formulated to yield adhesion values that are greater than the tensile tear strength of rigid PVC to assure that the adhered PVC remains adhered to the substrate under environmental or physical stress.

The present invention is further described in detail by means of the following Examples. All parts and percentages are by weight, and all temperatures are in degrees Fahrenheit, unless explicitly stated otherwise.

EXAMPLES 1–38

Examples 1 to 12 are shown in Table 1. The adhesive compositions were produced as described above using the indicated ratios of Q-THANE QW20-1 and Q-THANE QW18-1 as first and second components respectively. No additional compounds such as tackifiers, surfactants, film-forming agents, and the like, were added to these compositions. The adhesive compositions shown in Examples 1–12 were applied to a 10 mil thick aluminum coupon and dried at 240° C. (464° F.) for 25 or 45 seconds. The temperature of the adhesive-coated aluminum coupon was adjusted to about 470° F., and a rigid PVC piece was pressed onto the dried adhesive as indicated in Table 1. Each composition was evaluated by peel test in the parallel (180°) arrangement. As indicated in Table 1, each peel test value is compared with the tensile tear strength of rigid PVC (45 lbs per linear inch).

TABLE 1

| Example | QW20-1 | QW18-1 | Tackifier | Defoamer | Surfactant | Drying/Lamination Conditions | Peel Strength (lbs/LI) |
|---|---|---|---|---|---|---|---|
| 1 | 20% | 80% | 0 | 0 | 0 | 240° C. for 25 sec; Press for 7 sec @ 100 psi; 470° F. coupon temperature | 42.4 |
| 2 | 35% | 65% | 0 | 0 | 0 | | 38.8 |
| 3 | 50% | 50% | 0 | 0 | 0 | | 41.6 |
| 4 | 63% | 37% | 0 | 0 | 0 | | 44.0 |
| 5 | 80% | 20% | 0 | 0 | 0 | | 49.0 |
| 6 | 87.5% | 12.5% | 0 | 0 | 0 | | 47.6 |
| 7 | 20% | 80% | 0 | 0 | 0 | 240° C. for 45 sec; Press for 7 sec @ 100 psi; 470° F. coupon temperature | 40.6 |
| 8 | 35% | 65% | 0 | 0 | 0 | | 42.0 |
| 9 | 50% | 50% | 0 | 0 | 0 | | 41.2 |
| 10 | 63% | 37% | 0 | 0 | 0 | | 45.0 |
| 11 | 80% | 20% | 0 | 0 | 0 | | 50.0 |
| 12 | 87.5% | 12.5% | 0 | 0 | 0 | | 49.0 |
| Tensile Tear Strength of Rigid PVC (180° Peel) | | | | | | | 45 |

Examples 13 to 28 are shown in Tables 2 and 3. The adhesive compositions were produced as described above using the indicated ratios of Q-THANE QW20-1 and Q-THANE QW18-1 as first and second components respectively. The adhesive compositions shown in Examples 13–28 were applied to a 10 mil thick aluminum coupon and dried at 240° C. (464° F.) for 25 or 70 seconds. The temperature of the adhesive-coated aluminum coupon was adjusted to about 470° F., and a rigid PVC piece was pressed onto the dried adhesive as indicated in Table 2. Each composition was evaluated by peel test in the parallel (180°) arrangement. As indicated in Table 2, each peel test value is compared with the tensile tear strength of rigid PVC (45 lbs per linear inch).

TABLE 2

| Example | QW20-1 | QW18-1 | Tackifier | Defoamer | Surfactant | Drying/Lamination Conditions | Peel Strength (lbs/LI) |
|---|---|---|---|---|---|---|---|
| 13 | 90% | 10% | 0 | 0 | 0 | 240° C. for 25 sec; Press (5 sec close; 7 sec hold) @ 100 psi | 45.0 |
| 14 | 80% | 20% | 0 | 0 | 0 | | 45.2 |
| 15 | 73% | 27% | 0 | 0 | 0 | | 44.5 |
| 16 | 63% | 37% | 0 | 0 | 0 | | 44.7 |
| 17 | 50% | 50% | 0 | 0 | 0 | | 41.5 |
| 18 | 35% | 65% | 0 | 0 | 0 | | 35.5 |
| 19 | 20% | 80% | 0 | 0 | 0 | | 29.5 |
| 20 | 68% | 26% | 5.5 | .005 | .005 | | 45.4 |
| Tensile Tear Strength of Rigid PVC (180° Peel) | | | | | | | 45 |

TABLE 3

| Example | QW20-1 | QW18-1 | Tackifier | Defoamer | Surfactant | Drying and Adhering Conditions | Peel Strength (lbs/LI) |
|---|---|---|---|---|---|---|---|
| 21 | 90% | 10% | 0 | 0 | 0 | 240° for 70 sec; Press (5 sec close; 7 sec hold) @ 100 psi | 45.4 |
| 22 | 80% | 20% | 0 | 0 | 0 | | 47.2 |
| 23 | 73% | 37% | 0 | 0 | 0 | | 59.0 |
| 24 | 63% | 37% | 0 | 0 | 0 | | 59.0 |
| 25 | 50% | 50% | 0 | 0 | 0 | | 58.0 |
| 26 | 35% | 65% | 0 | 0 | 0 | | 50.5 |
| 27 | 20% | 80% | 0 | 0 | 0 | | 31.9 |
| 28 | 68% | 26% | 5.5 | 0.2 | 0.2 | | 69.3 |
| Tensile Tear strength of Rigid PVC (180° Peel) | | | | | | | 45 |

Examples 20 and 28 shown in Tables 2 and 3 illustrate a particularly useful embodiment of the adhesive composition of the invention. This particular embodiment includes 68% by weight Q-THANE QW20-1, 26% by weight Q-THANE QW18-1, 5.5% by weight TACOLYN 1085 tackifier, 0.005% by weight butoxyethanol film forming agent, 0.005% by weight Dow Corning #62 defoamer, and 0.005% by weight Silwet surfactant. These Examples have peel strengths of 58.8 and 69.3 lbs per linear inch width, respectively.

Table 4 shows the effect of the tackifier TACOLYN 1085 on a combination of 73% by weight of QTHANE QW20-1, 27% by weight of QTHANE QW18-1, and 0.015% by weight of a combination of surfactant, film-forming agent, and defoamer. Each Example in Table 3 was prepared as described above. Tensile tear strength of the laminate was measured parallel (180°) from the laminate surface as described above.

TABLE 4

| Example | % Tacolyn | Drying/Lamination Conditions | Peel Strength |
|---|---|---|---|
| 29 | 0 | 240° C. for 25 sec; Press for 7 sec @ 100 psi; 470° F. coupon temperature | 44.5 |
| 30 | 3.5 | | 44.9 |
| 31 | 4.5 | | 58.7 |
| 32 | 5.5 | | 60.2 |
| 33 | 6.5 | | 44.0 |
| 34 | 0 | 240° C. for 25 sec; Press for 7 sec @ 100 psi; 470° F. coupon temperature | 59.0 |
| 35 | 3.5 | | 68.9 |
| 36 | 4.5 | | 82.3 |
| 37 | 5.5 | | 82.2 |
| 38 | 6.5 | | 79.0 |

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications are incorporated by reference in their entirety.

What is claimed is:

1. A water-based adhesive composition, comprising an admixture of:

a first aliphatic water-based urethane resin that is the reaction product of polycaprolactonediol or polycaprolactonetriol, 4,4-methylene bis(cyclohexyl isocyanate), and dimethylolpropionic acid extended with a diamine, said first aliphatic water-based urethane resin comprising from about 99 to about 20 percent by weight of said composition; and a second aliphatic water-based urethane resin that is the reaction product of 2,6-hexanediol, 4,4-methylene bis (cyclohexyl isocyanate), and dimethylolpropionic acid extended with a diamine, said second aliphatic water-based urethane resin comprising from about 1 to about 80 percent by weight of said composition.

2. The adhesive composition of claim 1, wherein said first aliphatic water-based urethane resin is Q-THANE QW20-1.

3. The adhesive composition of claim 1, wherein said second aliphatic water-based urethane resin is Q-THANE QW18-1.

4. The adhesive composition of claim 1, further comprising additional additives selected from the group consisting of film-forming agents, defoamers, tackifiers, dyes, surfactants, and combinations thereof.

5. The adhesive composition of claim 4, wherein said tackifier comprises about 0.1 to about 20 percent by weight of the total weight of said composition.

6. The adhesive composition of claim 5, wherein said tackifier is an aqueous dispersion of rosin ester.

7. The adhesive composition of claim 4, wherein said tackifier is an aromatic vinyl copolymer tackifier.

8. A water-based adhesive composition, comprising an admixture of:

a first aliphatic water-based urethane resin that is the reaction product of polycaprolactonediol or polycaprolactonetriol, 4,4-methylene bis(cyclohexyl isocyanate), and dimethylolpropionic acid extended with a diamine, said first aliphatic water-based urethane resin comprising from about 99 to about 20 percent by weight of said composition;

a second aliphatic water-based urethane resin that is the reaction product of 2,6-hexanediol, 4,4-methylene bis (cyclohexyl isocyanate), and dimethylolpropionic acid extended with a diamine, said second aliphatic water-based urethane resin comprising from about 1 to about 80 percent by weight of said composition; and a tackifier comprising about 3.5 to about 7.5 percent by weight of said composition.

9. The adhesive composition of claim 8, wherein said first aliphatic water-based urethane resin is Q-THANE QW20-1.

10. The adhesive composition of claim 8, wherein said second aliphatic water-based urethane resin is Q-THANE QW18-1.

11. The adhesive composition of claim 8, further comprising additional additives selected from the group consisting of film-forming agents, defoamers, dyes, surfactants, and combinations thereof.

12. The adhesive composition of claim 8, wherein said tackifier is an aqueous dispersion of rosin ester.

13. The adhesive composition of claim 12, wherein said tackifier is TACOLYN 1085.

14. The adhesive composition of claim 8, wherein said tackifier is an aromatic vinyl copolymer tackifier.

15. A water-based adhesive composition, comprising:
   about 68% by weight Q-THANE QW20-1;
   about 26% by weight Q-THANE QW18-1;
   about 5.5% by weight TACOLYN 1085;
   about 0.005% by weight butoxyethanol;
   about 0.005% by weight Dow Corning #62 defoamer; and
   about 0.005% by weight Silwet surfactant.

16. A method of adhering a workpiece to a substrate, comprising the steps of:
   a) applying an adhesive composition to a substrate, said adhesive composition comprising an admixture of:
      a first aliphatic water-based urethane resin that is the reaction product of polycaprolactonediol or polycaprolactonetriol, 4,4-methylene bis(cyclohexyl isocyanate), and dimethylolpropionic acid extended with a diamine, said first aliphatic water-based urethane resin comprising from about 99 to about 20 percent by weight of said composition;
      a second aliphatic water-based urethane resin that is the reaction product of 2,6-hexanediol, 4,4-methylene bis(cyclohexyl isocyanate), and dimethylolpropionic acid extended with a diamine, said second aliphatic water-based urethane resin comprising from about 1 to about 80 percent by weight of said composition; and
      a tackifier comprising about 0.1 to about 20 percent by weight of said composition;
   b) drying said adhesive composition at a temperature of from 400° to 600° F. for from between 30 min and 10 sec; and
   c) adhering said workpiece to said substrate.

17. The method of claim 16, wherein said adhering step includes pressing said substrate and said workpiece together at about 100 psi for approximately 7 seconds.

18. The method of claim 16, wherein said first aliphatic water-based urethane resin is Q-THANE QW20-1.

19. The method of claim 16, wherein said second aliphatic water-based urethane resin is Q-THANE QW18-1.

20. The method of claim 16, wherein said adhesive composition further comprises additional additives selected from the group consisting of film-forming agents, defoamers, dyes, surfactants, and combinations thereof.

21. The method of claim 16, wherein said tackifier is selected from the group consisting of TACOLYN 1085, Piccotex LC, and Pentalyn.

* * * * *